US006138809A

United States Patent [19]

Kinoshita et al.

[11] Patent Number: 6,138,809

[45] Date of Patent: Oct. 31, 2000

[54] INSULATED ELECTROMAGNETIC COIL FOR ELECTROMAGNETIC CLUTCH

[75] Inventors: Masahiro Kinoshita, Kariya; Yasuo Tabuchi, Toyoake, both of Japan

[73] Assignee: Denso Corporation, Kariya, Japan

[21] Appl. No.: 09/133,648

[22] Filed: Aug. 13, 1998

[30] Foreign Application Priority Data

Sep. 17, 1997 [JP] Japan .................................... 9-252289

[51] Int. Cl.[7] ........................... F16D 37/02; B29C 31/06; H01F 7/00; H01F 37/02

[52] U.S. Cl. .................... 192/84.961; 264/275; 335/296; 336/96

[58] Field of Search ............................ 192/84.941, 84.76, 192/84.961; 335/282, 295, 296, 299; 336/96; 214/275, 278

[56] References Cited

U.S. PATENT DOCUMENTS

| | | | |
|---|---|---|---|
| 1,880,821 | 10/1932 | Connor et al. | 336/96 |
| 2,385,460 | 9/1945 | Omansky | 336/96 |
| 2,602,035 | 7/1952 | Camilli et al. | 336/96 |
| 3,088,174 | 5/1963 | Kolt | 264/275 |
| 4,295,553 | 10/1981 | Sayo et al. . | |
| 4,935,713 | 6/1990 | Bekheet | 335/296 |
| 5,138,292 | 8/1992 | Forster | 335/278 |
| 5,199,541 | 4/1993 | Tobyama et al. | 192/84 C |
| 5,232,076 | 8/1993 | Nakagawa et al. | 192/84 C |
| 5,551,546 | 9/1996 | Tabayama et al. | 192/84.96 |
| 5,756,028 | 5/1998 | Liao | 264/275 X |

FOREIGN PATENT DOCUMENTS 741 254 A2 11/1996 European Pat. Off. .

*Primary Examiner*—Charles Marmor
*Assistant Examiner*—Roger Pang
*Attorney, Agent, or Firm*—Harness, Dickey & Pierce, PLC

[57] ABSTRACT

An electromagnetic clutch has an electromagnetic coil and a coil housing for accommodating the coil. The coil is inserted into the coil housing together with insulating members made of readily deformable insulating material. The insulating members are pressed downwardly by the coil and deformed according to an inner shape of the coil housing. As a result, the coil and the insulating members are accommodated in the coil housing with a preset gap between a surface of the coil and an inside surface of the coil housing, formed by the insulating members. The gap is filled with melted resin so that the coil is firmly secured in the coil housing. Thus, the coil can be readily secured in and insulated from the coil housing at a low cost.

3 Claims, 6 Drawing Sheets

INSULATED ELECTROMAGNETIC COIL FOR ELECTROMAGNETIC CLUTCH

CROSS-REFERENCE TO RELATED APPLICATION

This application relates to and claims priority from Japanese Patent Application No. Hei. 9-252289 filed Sep. 17, 1997, the contents of which are incorporated herein by reference.

BACKGROUND OF THE INVENTION

1. Field of the Invention

The present invention relates to an electromagnetic power transmission clutch, and more particularly to an improved clutch structure in which a magnetic coil is secured in and insulated from a coil housing. The magnetic clutch is suitably applied to a compressor in a vehicle air conditioner.

2. Related Art

A conventional compressor in a vehicle air conditioner is connected to a vehicle engine through a magnetic clutch. The magnetic clutch is used to connect and disconnect the compressor with the engine. JP-A-64-26032 discloses a structure in which a magnetic coil of such a magnetic clutch is secured in a ferrous metal coil housing. In JP-A-64-26032, an adhesive-type insulating tape is wound around an annular electromagnetic coil at a plurality of points along a circumference of the coil to maintain the winding shape of the coil. Therefore, when the coil is inserted into the coil housing, a predetermined gap is provided between a surface of the coil and an inside surface of the coil housing by the insulating tape. Further, the gap is filled with insulating resin so that the magnetic coil is secured in, while being insulated from, the coil housing.

However, in JP-A-64-26032, the number of tape windings must be large, because the gap between the surface of the coil and the inside surface of the coil housing is formed by the insulating tape. If the number of tape windings is small, the resulting thickness of the tape wound around the coil is decreased. In this case, direct contact between a portion of the coil not insulated by the tape and the coil housing may occur due to deformation or irregularity of the coil, resulting in inadequate coil insulation. If the number of tape windings around the coil is increased, manufacturing and materials costs would both increase.

SUMMARY OF THE INVENTION

The present invention is made in light of the foregoing problem, and it is an object of the present invention to provide an electromagnetic clutch having an electromagnetic coil which can be firmly secured in and insulated from a coil housing at a low cost.

According to the present invention, an electromagnetic clutch has an electromagnetic coil, and a coil housing for accommodating the coil. The coil is inserted into the coil housing together with a plurality of string-shaped insulating members made of deformable insulating material. The insulating members are pressed downwardly by the coil and deformed according to an inner shape of the coil housing. As a result, a preset gap is readily formed by the insulating members between a surface of the coil and an inside surface of the coil housing. Further, the gap is filled with a resin member so that the coil is firmly secured in the coil housing. Therefore, the resin member can accurately spread across the entire surface of the coil through the gap. As a result, the coil can be firmly secured in, and excellently insulated from, the coil housing at a low cost.

Preferably, the insulating members are disposed between each of a plurality of coil holding members wound around the coil for holding a winding shape of the coil, when the coil and the insulating members are accommodated in the coil housing. Therefore, the coil holding members can also form the gap between the coil and the coil housing to ensure that the gap is formed even if the winding shape of the coil is slightly deformed.

Preferably, the insulating members are made of a material that the resin member can penetrate. Therefore, the magnetic coil is more effectively insulated from, the coil housing.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS

Embodiments of the present invention will be described hereinafter with reference to the accompanying drawings.

First Embodiment

Figure 1:
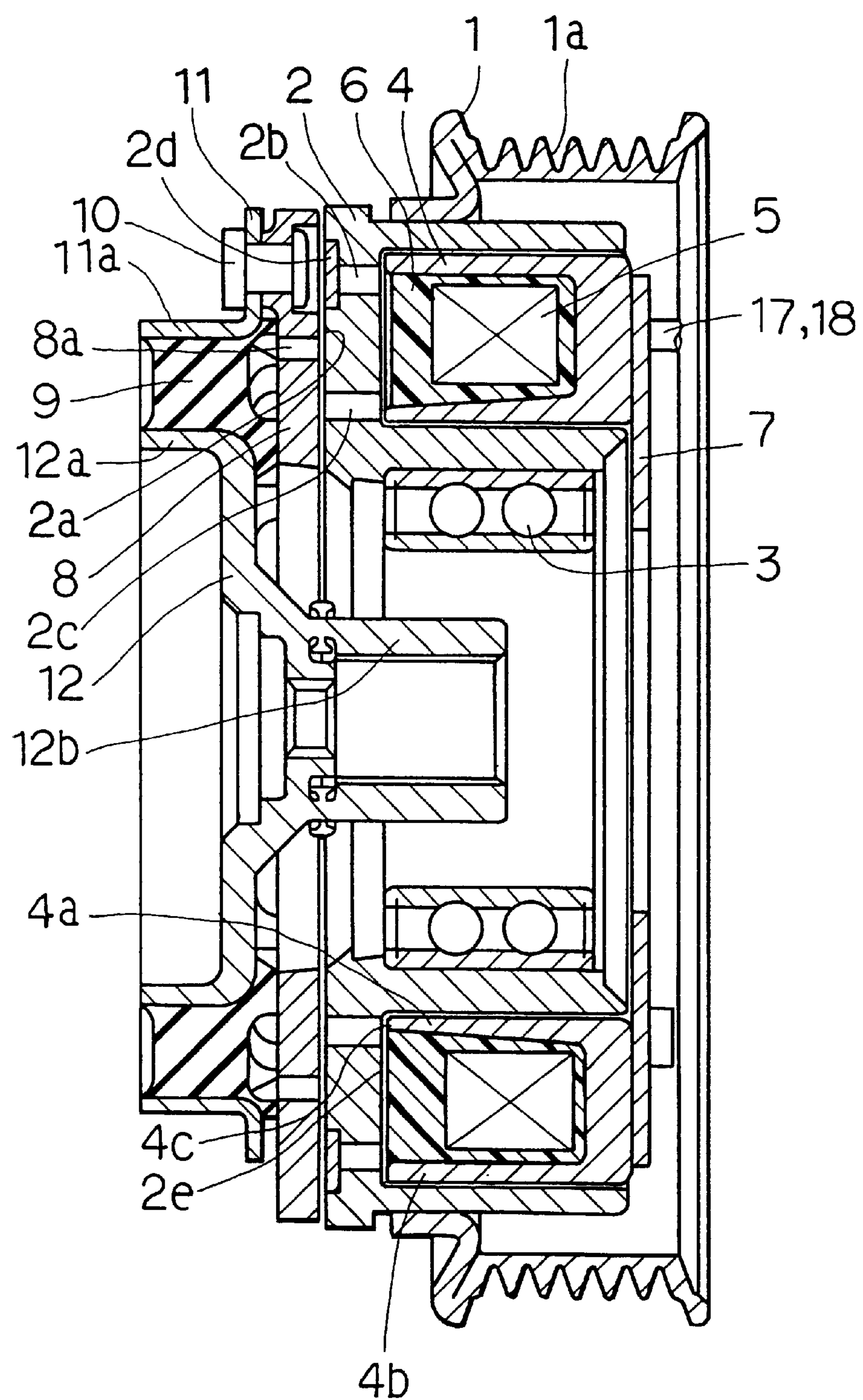
FIG. 1 is a cross-sectional view showing a magnetic clutch to which the present invention is applied.

Referring to FIG. 1, a drive pulley 1 is rotated by power transmitted from a vehicle engine through a multi-V-belt (not shown). The pulley 1 is made of ferrous metal and is integrally formed with a groove portion 1*a* which has a plurality of V-grooves for engaging with the multi-V-belt.

A drive rotor 2 is made of ferrous metal and is formed into a double cylinder having a U-shaped cross-section. The rotor 2 is connected to the pulley 1 by welding or other appropriate methods. Several bearings 3 are disposed at an inner side of the drive rotor 2. The rotor 2 is held by the bearings 3 on a cylindrical protruding portion of a front housing of a compressor (not shown) so that the rotor 2 can rotate freely. The compressor is used for compressing refrigerant in a refrigerant cycle of a vehicle air conditioner.

As shown in FIG. 1, a coil housing 4 is made of ferrous metal and is formed into a double cylinder having a U-shaped cross-section for accommodating an electromagnetic coil 5. The coil housing 4 operates as a stationary magnetic pole member. The coil housing 4 has an inner cylinder portion 4_a_ and an outer cylinder portion 4_b_. The magnetic coil 5 is inserted into a housing space 4_d_ of the coil housing 4 formed between the inner cylinder portion 4_a_ and the outer cylinder portion 4_b_, and is secured in and insulated from the coil housing 4 by a resin member 6, which fills the housing space 4_d_ of the coil housing 4. The resin member 6 is formed of resin material which can be formed at a relatively low temperature (i.e., 130–140° C.), such as epoxy resin or unsaturated polyester resin.

The coil housing 4 is disposed in a housing space of the rotor 2 having a U-shaped cross-section to provide a small gap between the coil housing 4 and the rotor 2. A stay 7 made of ferrous metal and formed into a ring shape is connected to a bottom rear side of the coil housing 4 by spot welding or the like. The coil housing 4 is secured to the above-mentioned front housing of the compressor through the stay 7.

The rotor 2 has a friction surface 2_a_ extending in a radial direction of the rotor 2. The friction surface 2_a_ has two magnetic blow-out grooves 2_b_, 2_c_ formed into an arc shape extending along a periphery of the rotor 2. The magnetic blow-out groove 2_b_ is located at an outer peripheral side of the magnetic blow-out groove 2_c_. A friction member 2_d_ is attached to the magnetic blow-out groove 2_b_ to improve torque transmission.

Still referring to FIG. 1, an armature 8 is made of ferrous metal and formed into a ring shape, and is disposed against the friction surface 2_a_ of the rotor 2. When current to the electromagnetic coil 5 is shut off, the armature 8 is maintained a predetermined small distance away from the friction surface 2_a_ by an elastic force of an elastic member 9, which will be described later. The armature 8 also has a magnetic blow-out groove 8_a_ formed into an arc extending along a periphery of the armature 8.

When current is supplied to the electromagnetic coil 5, a magnetic flux develops and flows through a magnetic circuit formed by the rotor 2, the coil housing 4 and the armature 8. The armature 8 is secured to a ring-shaped holding member 11 made of ferrous metal, by means of a rivet 10 made of ferrous metal. The elastic member 9 is disposed between an inner surface of a cylinder portion 11_a_ of the holding member 11 and an outer surface of an outer cylinder portion 12_a_ of a hub 12, and is integrally formed with the holding member 11 and the hub 12 to be connected thereto. Thus, the elastic member 9 is disposed between the holding member 11 and the hub 12.

The elastic member 9 has a cylindrical shape. Preferably, the elastic member 9 is made of rubber which is excellent in torque transmission and in absorption of torque fluctuation within a temperature range of −30 to 120° C., in which an ordinary vehicle can be used. For example, chlorinated butyl rubber, acrylnitrile-butadiene rubber and ethylene propylene rubber are suitable as the material of the elastic member 9. The hub 12 is made of ferrous metal. A shaft (not shown) of the compressor is fit into a center cylinder 12_b_ of the hub 12 using a spline or the like, and is secured to the hub 12 by a bolt (not shown).

Next, a structure in which the electromagnetic coil 5 is secured into the coil housing 4 will be described.

Figure 2:
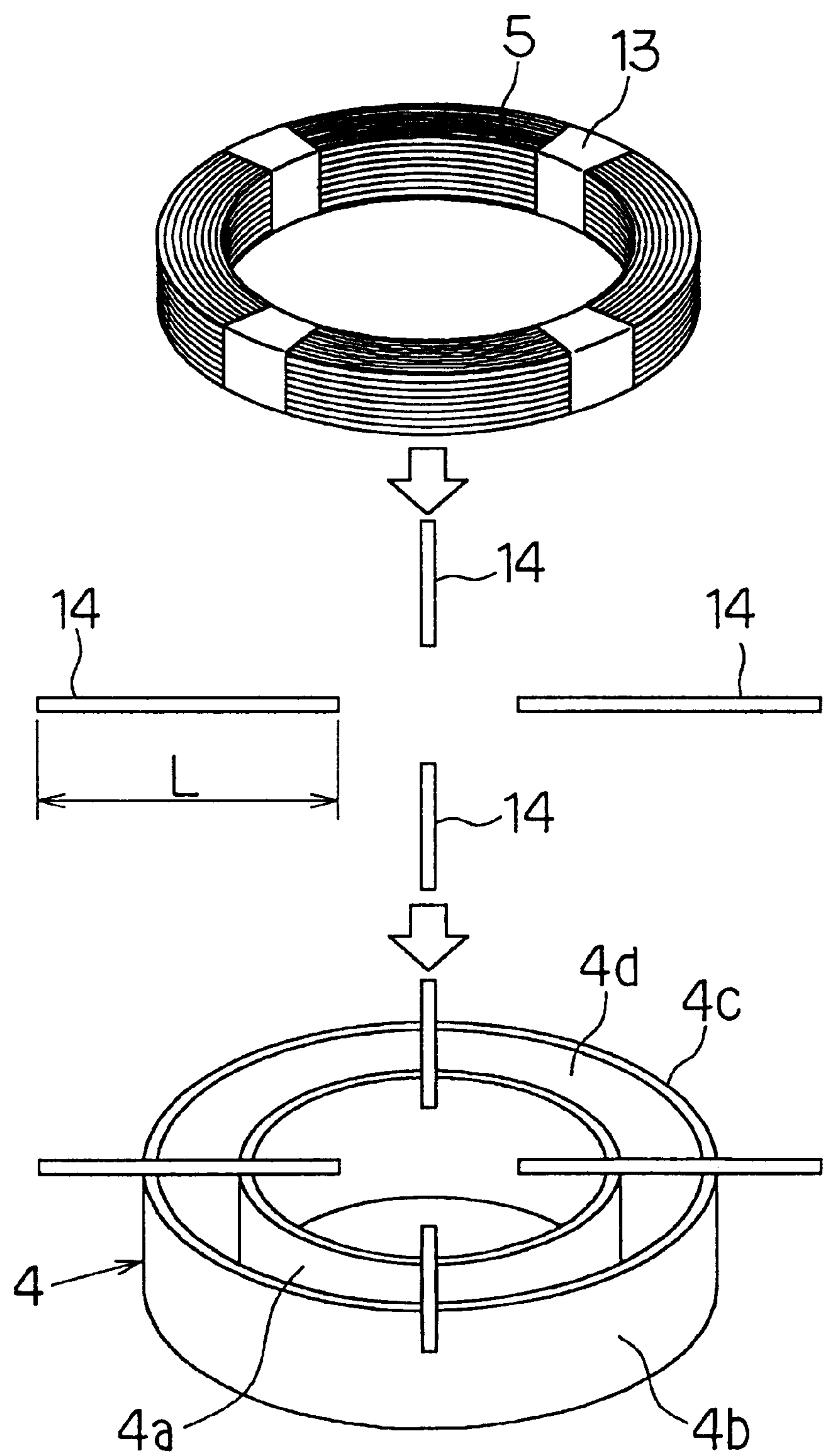
FIG. 2 is an exploded view showing a part of the magnetic clutch according to a first embodiment of the present invention.

As shown in FIG. 2, the electromagnetic coil 5 is constructed from a large number of wire windings formed into an annular shape. An adhesive-type insulating tape made of paper is wound around the coil 5 as a coil holder 13 at a plurality of points along the circumference of the coil 5 to maintain the coil shape. In the first embodiment, the coil holder 13 is wound around the coil 5 at four points, as shown in FIG. 2.

Figure 3:
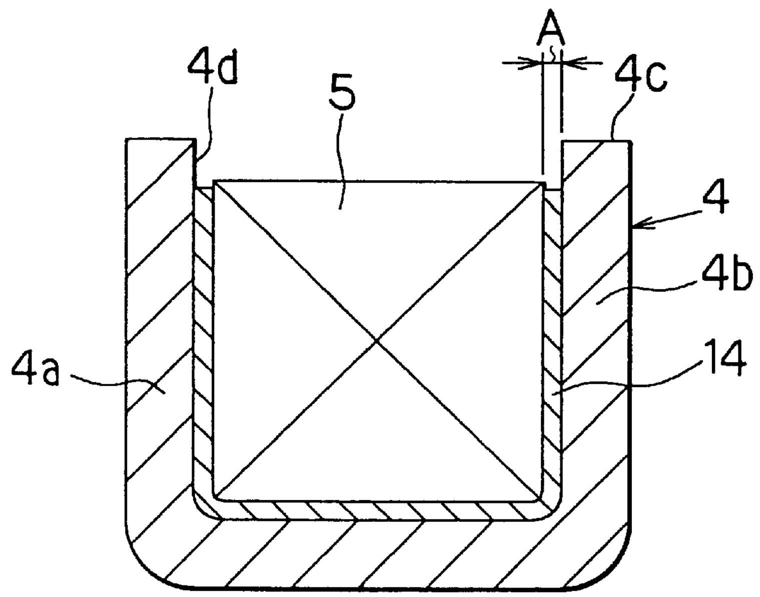
FIG. 3 is a partial cross-sectional view showing a coil housing accommodating a magnetic coil and insulating members according to the first embodiment.

Paper string-like insulating members 14 are placed on an open end 4_c_ of the coil housing 4 in such a manner that one of the insulating members 14 is located between each of the coil holders 13. Each insulating member 14 is easily deformed because it is made of paper. Next, the coil 5 is placed so that it contacts the middle portion of each insulating member 14. When the coil 5 is inserted into the housing space 4_d_ of the coil housing 4, each of the insulating members 14 is pressed downwardly by the coil 5 and deformed according to an inner shape of the coil housing 4 or a shape of the coil 5, and is nested between the coil housing 4 and the coil 5. FIG. 3 shows a state in which the coil 5 and the insulating members 14 are accommodated in the coil housing 4.

Each string-like insulating member 14 preferably has a circular cross-section with a diameter of approximately 2.5 mm, for example. As shown in FIG. 3, the diameter of the circular cross-section of the insulating member 14 is determined so that a preset gap A is formed between the surface of the coil 5 and the inner surface of the coil housing 4 when the insulating members 14 and the coil 5 are accommodated in the annular housing space 4_d_ of the coil housing 4. A longitudinal length L of the insulating member 14 is determined so that the insulating member 14 spans the entire peripheral surface of the coil 5 in the gap A, as shown in FIG. 3.

According to the first embodiment, the gap A can be formed by the insulating members 14 disposed on the coil 5 at four points along the circumference of the magnetic coil 5. Further, each of the insulating members 4 is located between each of the coil holders 13 which maintain the coil 5 as a unit. Therefore, the coil holders 13 can also contribute to form the gap A. Thus, the gap A is accurately formed even if the annular shape of the coil 5 is slightly deformed.

Figure 4:
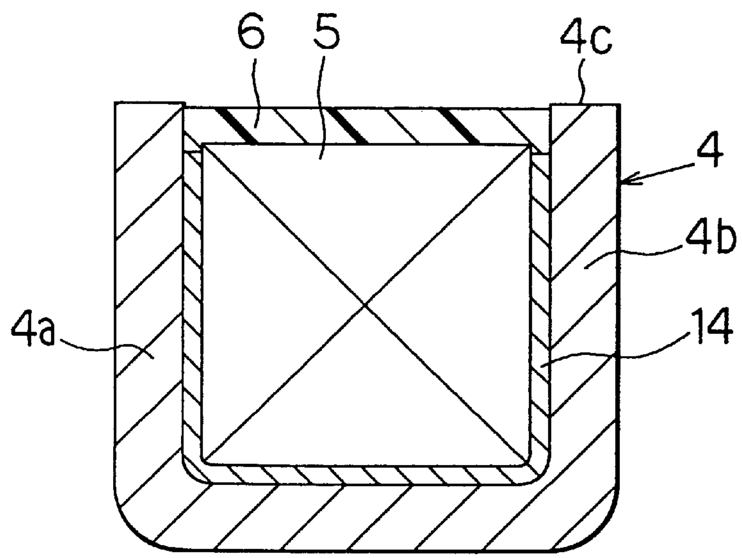
FIG. 4 is a partial cross-sectional view showing the coil housing filled with a resin member according to the first embodiment.

Next, the housing space 4_d_ of the coil housing 4 is filled with the melted material of the resin member 6 from the open end 4_c_, as shown in FIG. 4. The melted material of the resin member 6 spreads across the surface of the coil 5 through the gap A. Further, the melted material of the resin member 6 penetrates the coil holders 13 and the insulating members 14 because both of the coil holders 13 and the insulating members 14 are made of paper. Thus, the resin member 6 affixes the coil 5 and insulates the surface of the coil 5 from the inner surface of the coil housing 4.

Further, in the first embodiment, the gap A between the coil 5 and the coil housing 4 is formed by the insulating members 14 inserted into the housing space 4_d_ of the coil housing 4 and deformed by the coil 5. Therefore, the need for winding an adhesive-type thin insulating tape around the coil to form the gap A is eliminated, thereby decreasing the time needed to attach the coil 5 to the coil housing 4. Furthermore, the paper insulating member 14 is less expensive than the adhesive-type thin insulating tape. Therefore, the cost of material of the electromagnetic clutch also can be decreased.

Next, operation of the electromagnetic clutch will be described.

When the vehicle engine is activated, rotation of a crank pulley of the engine is transmitted to the clutch pulley 1 through the multi-V-belt, and the pulley 1 and the rotor 2 rotate together. When current is supplied to the electromagnetic coil 5 to operate the air conditioner, magnetic flux develops and flows through the magnetic circuit formed by the coil housing 4, the rotor 2 and the armature 8 connected. As a result, an electromagnetic attractive force is generated between the friction surface 2$a$ of the rotor 2 and the armature 8. Therefore, the armature 8 is attracted to, and contacts, the friction surface 2$a$, withstanding an elastic force of the elastic member 9 in an axial direction, which is a leftward direction in FIG. 1.

As a result, the rotor 2 and the armature 8 rotate as a unit, and the rotation of the armature 8 is transmitted to the hub 12 through the rivet 10, the holding member 11 and the elastic member 9. Since the shaft of the compressor is integrally connected to the hub 12, the rotation of the pulley 1 is eventually transmitted to the shaft of the compressor, and the compressor starts operation. The elastic member 9 is also used to absorb torque fluctuation caused by the compressor during normal operation of the compressor.

When current to the electromagnetic coil 5 is shut off, the electromagnetic attractive force between the friction surface 2$a$ of the rotor 2 and the armature 8 ceases, and the armature 8 is separated from the friction surface 2$a$ of the rotor 2 due to the axial elastic force of the elastic member 9. As a result, rotation transmission to the shaft of the compressor is shut off, and the compressor stops operation.

Second Embodiment

Figure 5:
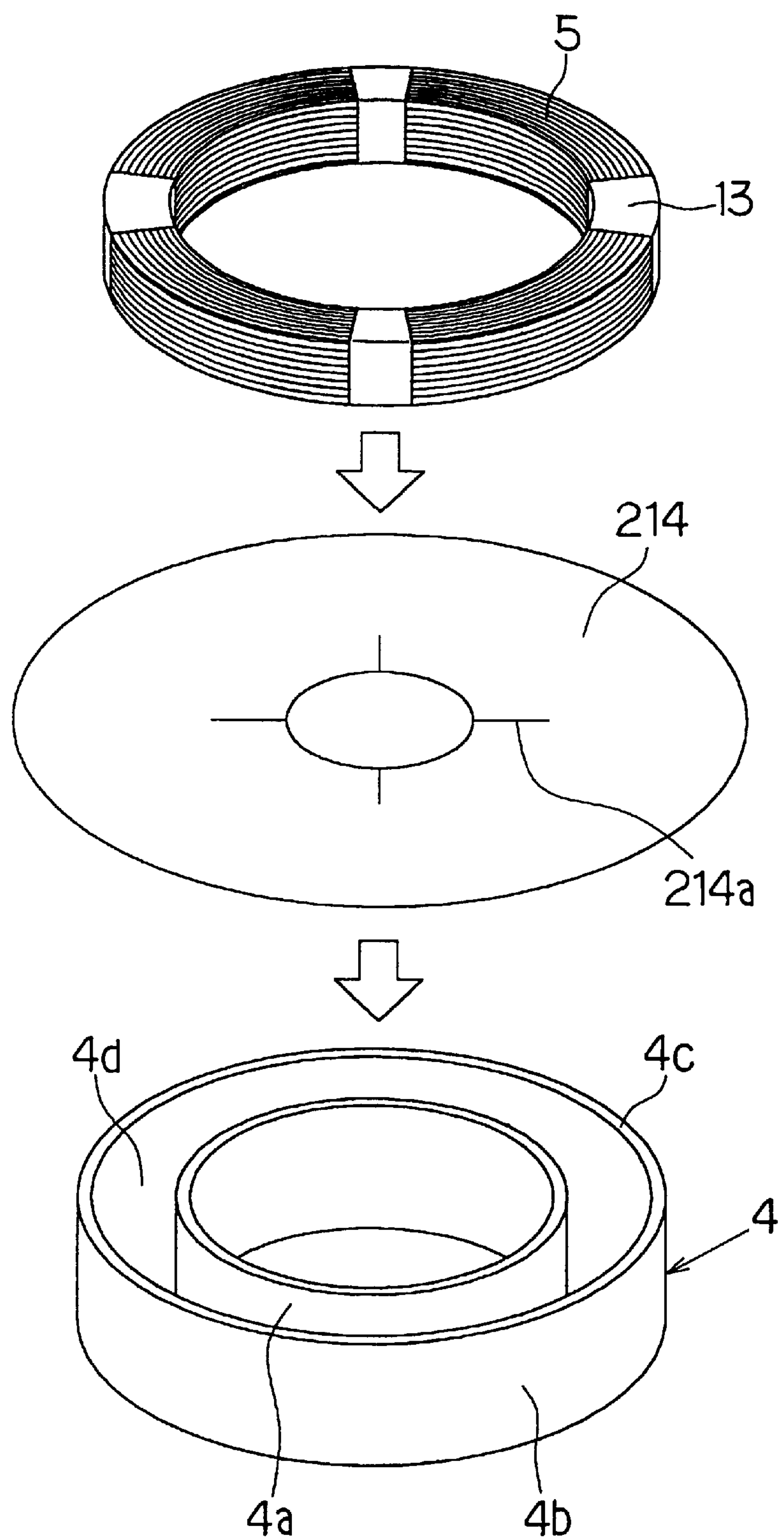
FIG. 5 is an exploded view showing a part of a magnetic clutch according to a second embodiment of the present invention.

A second embodiment of the present invention will be described with reference to FIGS. 5, 6A and 6B. In this and following embodiments, components which are substantially the same as those in previous embodiments are assigned the same reference numerals.

In the first embodiment, an insulating string made of paper is used as the insulating member 14. However, in the second embodiment, as shown in FIG. 5, an insulating sheet made of, for example, cotton cloth and formed into a ring shape is used as an insulating member 214. As with the insulating member 14 in the first embodiment, the insulating member 214 can be readily deformed, and is penetrable by the material of the resin member 6. As shown in FIG. 5, an inner circumference of the insulating member 214 has four slits 14$a$ so that deformation in the vicinity of the inner circumference of the insulating member 214 is facilitated.

Figure 6A:
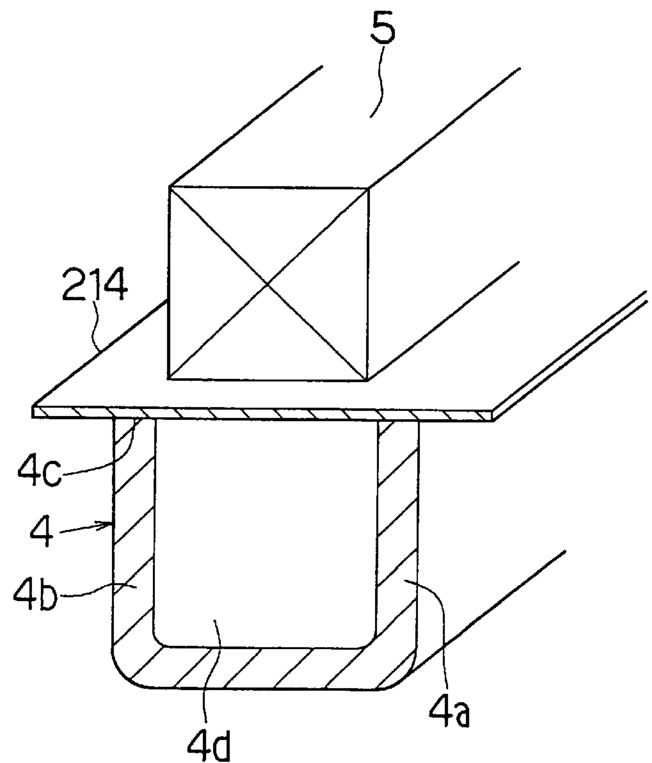
FIG. 6A is a partial perspective view of a magnetic coil, an insulating member and an coil housing before assembly according to the second embodiment.
Figure 6B:
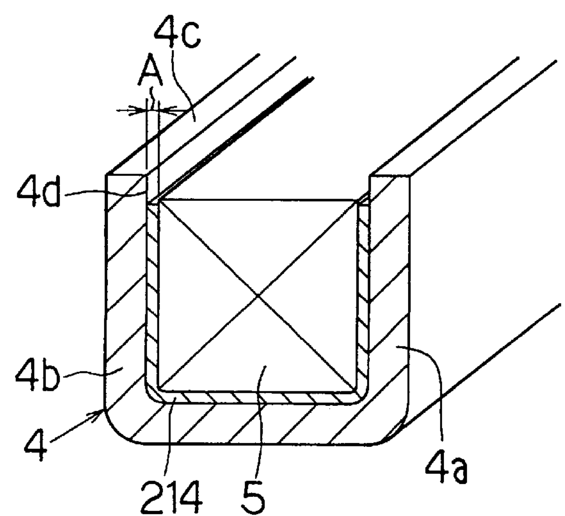
FIG. 6B is a partial perspective view of the magnetic coil, the insulating member and the coil housing after assembly according to the second embodiment.

In the second embodiment, as shown in FIG. 6A, the insulating member 214 is placed on the open end 4$c$ of the coil housing 4, and the electromagnetic coil 5 is placed cover the insulating member 214. Then, the coil 5 is inserted into the housing space 4$d$ of the coil housing 4 together with the insulating member 214, while the insulating member 214 is pressed at a middle part of the insulating member 214 in a radial direction by the coil 5. As a result, the coil 5 and the insulating member 14 are accommodated in the housing space 4$d$ of the coil housing 4, as shown in FIG. 6B.

The insulating member 214 has a thickness of approximately 0.2–0.3 mm. However, the thickness of the insulating member 214 is determined so that a preset gap A is formed between the surface of the coil 5 and the inner surface of the coil housing 4 when the coil 5 and the insulating member 214 are accommodated in the housing space 4$d$ of the coil housing 4, as shown in FIG. 6B. Further, outer and inner diameters of the insulating member 214 are determined so that the insulating member 214 covers the entire surface of the coil 5 in the gap A. After inserting the coil 5 and the insulating member 214 into the coil housing 4, the housing space 4$d$ of the coil housing 4 is filled with the melted material off the resin member 6, from the open end 4$d$.

According to the second embodiment, as in the first embodiment, the need to wind a thin insulating tape around the magnetic coil 5 to form a preset gap between the coil 5 and the coil housing 4 is eliminated, resulting in an improved coil attachment efficiency. Further, according to the second embodiment, the insulating member 214 covers the entire circumference of the gap A because the insulating member 214 is a sheet. This further ensures insulation of the coil 5.

Third Embodiment

Figure 7:
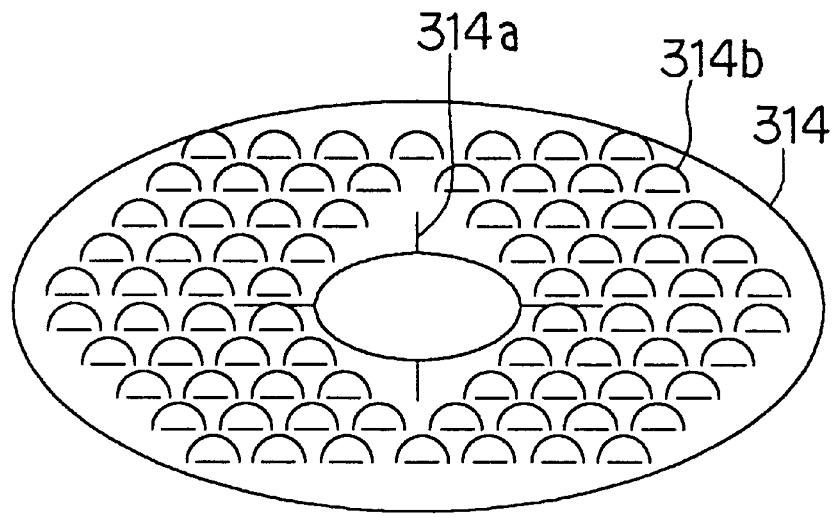
FIG. 7 is a perspective view showing an insulating member according to a third embodiment of the present invention.

In the second embodiment, the insulating member 214 is a flat sheet. However, in a third embodiment of the present invention, an insulating sheet having a plurality of protrusions 14$b$ on one surface of the sheet is used as an insulating member 314, as shown in FIG. 7. According to the third embodiment, owing to the protrusions 14$b$, the width of the gap A between the electromagnetic coil 5 and the coil housing 4 can be made larger than the original thickness of the insulating member 314.

Fourth Embodiment

Figure 8:
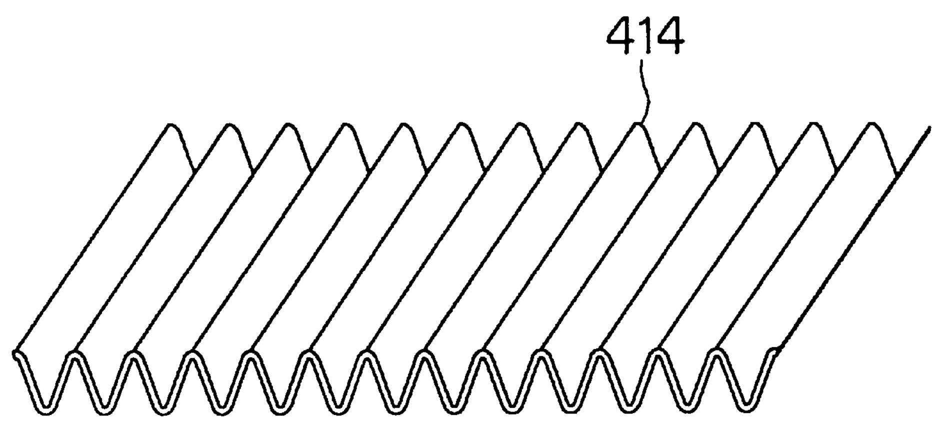
FIG. 8 is a perspective view showing an insulating member according to a fourth embodiment of the present invention.

In the first embodiment, insulating strings are used as the insulating members 14. In a fourth embodiment of the present invention, as shown in FIG. 8, corrugated insulating members having a rectangular shape are used as insulating members 414. According to the fourth embodiment, owing to the corrugated-shape of the insulating members 414, the width of the gap A can be made larger than the original thickness of the insulating member 414.

In the above-mentioned second and third embodiments, each of the insulating members 214, 314 is formed into a single ring-like sheet, having enough surface area to cover the entire opening area of the open end 4$c$ of the coil housing 4. However, each of the insulating members 214, 314 may alternatively be formed into a plurality of sheets formed into an arc shape, partially covering the open end 4$c$.

In the above-mentioned embodiments, the insulating members 14, 214, 314 and 414 are made of paper or cotton cloth. However, the insulating members 14, 214, 314 and 414 may also be made of glass fiber, felt, rubber, synthetic fiber or porous material such as polyurethane form. In other words, the insulating members 14, 214, 314 and 414 may be made of any material that can be easily deformed and that is penetrable by the material of the resin member 6.

In the above-mentioned first embodiment, the electromagnetic clutch is used for a compressor in a vehicle air conditioner; however, the present invention may also be applied to electromagnetic clutches in various use.

Although the present invention has been fully described in connection with preferred embodiments thereof with reference to the accompanying drawings, it is to be noted that various changes and modifications will become apparent to those skilled in the art.

Such changes and modifications are to be understood as being within the scope of the present invention as defined by the appended claims.

What is claimed is:

1. A method of manufacturing an electromagnetic coil comprising steps of:

setting an insulating member, which is made of deformable insulating material, on an opening of a coil housing;

inserting said electromagnetic coil in said coil housing through said opening;

bending said insulating member via said electromagnetic coil during said step of inserting so that said insulating member is nested to an inner periphery of said coil housing and forms a predetermined gap between said electromagnetic coil and said coil housing; and filling said coil housing with resin so that said predetermined gap is securely maintained.

2. A method of manufacturing an electromagnetic coil according to claim 1, wherein:

said insulating member is made of porous insulating material; and said filling step includes a step of filling said coil housing with melted resin to penetrate said porous insulating material.

3. A method of manufacturing an electromagnetic coil according to claim 2, wherein said insulating member is made of paper.

* * * * *